Nov. 21, 1967 K. L. GREES ET AL 3,354,326
DIRECT CURRENT STATIC SWITCH
Filed June 22, 1965
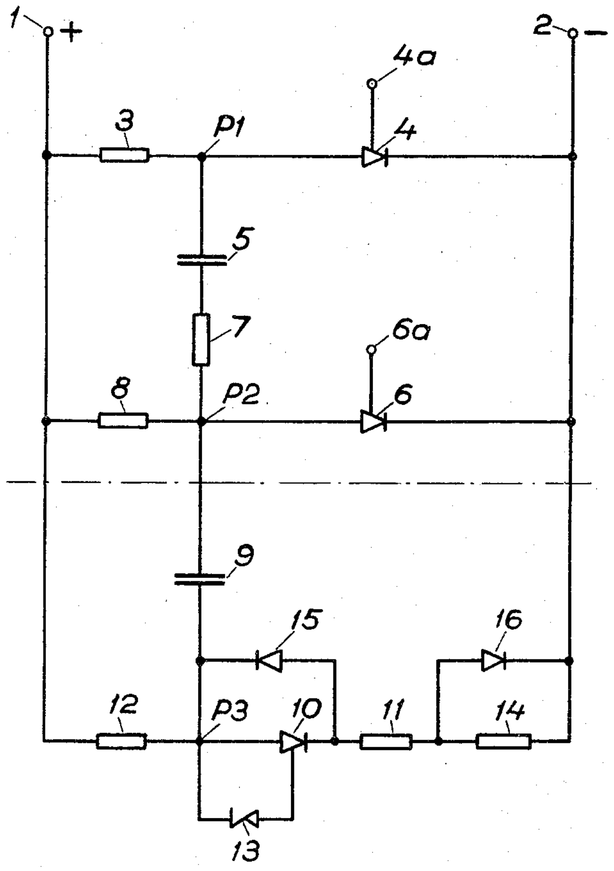
INVENTORS
KARL LENNART GREES
SVEN OLOF KARLSSON
BY
Bailey, Stephens & Huettig
ATTORNEYS United States Patent Office 3,354,326

Patented Nov. 21, 1967

3,354,326
DIRECT CURRENT STATIC SWITCH

Karl Lennart Grees, Irsta, and Sven Olof Karlsson, Vasteras, Sweden, assignors to Allmänna Svenska Elektriska Aktiebolaget, Vasteras, Sweden, a Swedish corporation Claims priority, application Sweden, July 10, 1964, 8,467/64
Filed June 22, 1965, Ser. No. 465,891
4 Claims. (Cl. 307—88.5)

ABSTRACT OF THE DISCLOSURE

A D.C. static switch with a main thyristor connected in parallel with an extinguishing circuit comprising a capacitor connected in series with an auxiliary thyristor. To obtain short charging time for the capacitor, its charging resistor is of comparatively low resistance value so that the prospective current through the auxiliary thyristor will exceed the holding current of that thyristor. To turn off this current the auxiliary thyristor is connected in parallel with an additional extinguishing circuit comprising an auxiliary capacitor in series with a semi-conductor element automatically controlled by a Zener diode.

The present invention relates to a direct current static switch with controllable semi-conductor rectifiers or so-called thyristors. Such a switch usually contains a thyristor intended to be connected in series with the load, an extinguishing circuit for this thyristor and control means for controlling the thyristor. An extinguishing circuit usually contains a so-called extinguishing capacitor which through an auxiliary thyristor is connected in parallel to the thyristor connected in series with the load. The extinguishing capacitor can be charged in different ways to a suitable voltage and, when the switch is to be turned off, the auxiliary thyristor is fired, and the capacitor voltage is connected as a blocking voltage across the thyristor of the main current circuit. The most simple of the known circuits has however either the disadvantage that the leakage current in the open position of the switch is uneconomically large, or that the switch must be closed for a relatively long time before an opening operation can take place. Other known circuits where these disadvantages are eliminated usually contain a resonance circuit with an inductive element, for example a reactor or an auto-connected transformer. As certain load elements are sensitive to inductances in the feeding network, these connections are however sometimes less suitable.

With the present invention it has become possible to manufacture thyristor switches for direct current, which are not affected by the above mentioned disadvantages. A static switch according to the invention contains a thyristor to which an auxiliary thyristor is connected in parallel through an extinguishing capacitor, and the static switch is characterised by a branch connected in parallel to the auxiliary thyristor containing a series connection of an auxiliary capacitor and a controlled semi-conductor element. With this arrangement the extinguishing circuit can be dimensioned so that the charging time for the extinguishing capacitor becomes very short. Through this arrangement, the static switch can be turned off a short while after it is closed, which is particularly important if for example a release impulse caused by over-current is produced immediately at the time of closing. The continuous current, which flows through the auxiliary thyristor when this has been fired and which as a consequence of the above mentioned dimensioning is relatively great, can be broken by connecting said auxiliary capacitor across the auxiliary thyristor by means of the controllable semi-conductor element.

Said semi-conductor element can suitably be a thyristor, whereby it is achieved that only a short firing pulse needs to be fed to the control circuit of the element in order to bring about discharging of the auxiliary capacitor. The control can be carried out very simply by means of a Zener diode connected to the control electrode of the semi-conductor element. In order to protect the semi-conductor element from dangerous voltages in the reverse direction, a diode is suitably reverse-parallel-connected to the semi-conductor element.

The invention will be further clarified in connection with an embodiment shown in the accompanying drawing. In the part of the figure which is above the dashed line, a very usual connection for closing and breaking direct current is shown, and its method of operation will be described first.

Between the terminals 1 and 2 of a direct current supply with the voltage U, a load impedance 3 is connected across a thyristor 4. Parallel to the thyristor 4 a capacitor 5 is connected in series with an auxiliary thyristor 6 and an impedance element 7, which can be a resistor or a small inductance coil. For charging the capacitor 5 a charging resistor 8 has been arranged. When the thyristor 4 of the main current circuit is fired with a firing impulse on the gate electrode *4a*, the current will flow through the load impedance 3, so that the point P1 will substantially take the same potential as the minus pole of the direct current supply, since the forward voltage drop across the thyristor can be neglected. The capacitor 5 will therefore be charged through the resistor 8 and the impedance element 7 to the network voltage U. When the current through the load impedance 3 is to be broken, the auxiliary thyristor 6 is fired by means of a firing impulse on the gate electrode *6a*, the capacitor 5 being discharged on the thyristor 4 of the main current circuit. The discharging current is directed opposite to the load current flowing through the thyristor 4, and when these two currents almost compensate each other, the thyristor is turned to the blocking state and the load current is broken.

If in this known arrangement the current through the auxiliary thyristor 6 is also to be broken, the resistor 8 must have such a large resistance that the current through the resistor, after the thyristor 6 is ignited, is less than the holding current of the thyristor 6. This means that the charging of the capacitor 5 is carried out comparatively slowly, so that the load current cannot be broken before a time of about one second has passed after the thyristor 4 is fired. If such a small resistance value for the resistor 8 is chosen that the charging time for the capacitor 5 is some tenths of a second, a relatively large current will flow through the resistor 8 and the auxiliary thyristor 6 until either the thyristor 4 will be fired again or the supply voltage to the thyristor switch will be disconnected.

By means of a circuit according to the invention, which is shown beneath the broken line, these disadvantages can however be eliminated. Parallel to the auxiliary thyristor 6 a branch is connected containing a series connection of amongst other things an auxiliary capacitor 9, a thyristor 10 and a limiting resistor 11. The auxiliary capacitor 9 is besides connected to the plus pole of the voltage supply across a resistor 12 with relatively large resistance. The thyristor 10, which is relatively small, receives its firing current through a Zener diode 13. In the circuit there are also the resistor 14 and the diodes 15 and 16 connected according to the figure.

The arrangement operates in the following way. When the auxiliary thyristor 6 is in its blocking state, the point P2 is at the same potential as the plus pole of the voltage supply. The voltage between the point P3 and the minus pole of the voltage supply will be substantially equal to the Zener voltage $U_z$ of the Zener diode 13. The capacitor 9 thus becomes charged to the voltage $U-U_z$. When the auxiliary thyristor 6 is fired, the point P2 will be at practically the same potential as the minus pole of the voltage supply. The voltage across the capacitor 9 can however not be changed momentarily and accordingly the lower plate of the capacitor will during the first moment take the potential $-(U-U_z)$ relative to the minus pole of the voltage supply. The Zener voltage $U_z$ can suitably be of the order of 15 volts, while the network voltage U can be several hundred volts, and $U-U_z$ therefore is approximately equal to U. In order to prevent the thyristor 10 from being subjected to this high back voltage, the diode 15 is reverse-parallel-connected to the thyristor 10. The current through the diode 15 is limited to a suitable value by means of the resistors 11 and 14. The auxiliary capacitor 9 now begins to be charged and when the potential at the point P3 relative to the minus pole of the voltage supply is equal to the Zener voltage $U_z$, the thyristor 10 is supplied with ignition current. The auxiliary capacitor 9 is now discharged through the thyristor 10, the resistor 11, the diode 16 and the auxiliary thyristor 6. This discharging current is directed opposite to the current flowing over the resistor 8 in the forward direction of the thyristor 6, and by suitable dimensioning of the capacitor 9, the Zener voltage $U_z$ and the resistor 11 the current through the thyristor 6 can be made to cease for a sufficiently long time so that the thyristor 6 blocks the currents in the forward direction.

The resistance of the resistor 12 can be chosen to be so large that the time from when the auxiliary thyristor 6 is fired to when the thyristor 10 fires becomes 0.5 to 1 second, so that the relatively large charge current from the extinguishing capacitor 5 through the auxiliary thyristor 6 has disappeared when the thyristor 10 ignites. If the thyristor 6 does not go over from the on- to the off-state the first time the thyristor 10 ignites, the capacitor 9 is charged once more and the process is repeated again. When the thyristor 6 is turned off, a leakage current will flow through the resistor 12, the thyristor 10, the resistor 11 and the diode 16. The resistor 12 can however be dimensioned so that this leakage current becomes only some tenths of a milliampere and thus completely negligible compared with the leakage current through the thyristors 4 and 6.

We claim:

1. A direct current static switch for making and breaking a connection between a voltage source and a load impedance, said switch comprising a first controlled rectifier connected in series with said load impedance between a first and a second terminal, a second controlled rectifier, a first commutating capacitor and a first charging resistor; each of said controlled rectifiers having anode, cathode and gate electrodes; said cathodes of said first and second controlled rectifiers being connected to said second terminal, said second controlled rectifier and said first commutating capacitor being connected in series between the anode and cathode of said first controlled rectifier, said first charging resistor being connected between said first terminal and the junction point of said first commutating capacitor and said second controlled rectifier; wherein the improvement comprises a control means for automatically bringing said second controlled rectifier to the off-state, said control means including a second commutating capacitor, a controlled semi-conductor device having anode, cathode and gate electrodes, a second charging resistor, and a voltage sensing means; said second commutating capacitor and said controlled semi-conductor device being connected in series between the anode and cathode of said second controlled rectifier; said second charging resistor being connected between said first terminal and the junction point of said second commutating capacitor and said semi-conductor device; said voltage sensing means being connected between the anode and gate electrode of said semi-conductor device for applying a gating current to the gate electrode of said semi-conductor device at a predetermined voltage level.

2. A direct current static switch according to claim 1 wherein said controlled semi-conductor device is a third controlled rectifier.

3. A direct current static switch according to claim 1 wherein said voltage sensing means is a Zener diode.

4. A direct current static switch according to claim 1 wherein a diode is connected in inverse parallel connection with said controlled semi-conductor device.

References Cited

UNITED STATES PATENTS

| | | | |
|---|---|---|---|
| 3,120,620 | 2/1964 | Nowell | 307—88.5 |
| 3,176,158 | 3/1965 | Guignard | 307—88.5 |
| 3,198,989 | 8/1965 | Mahoney | 307—88.5 |
| 3,260,861 | 7/1966 | Dalley | 307—88.5 |

ARTHUR GAUSS, *Primary Examiner.*

J. ZAZWORSKY, *Assistant Examiner.*